United States Patent
Rodriguez

(10) Patent No.: US 11,132,912 B1
(45) Date of Patent: Sep. 28, 2021

(54) ELECTRONIC EDUCATIONAL DEVICE

(71) Applicant: Phil Rodriguez, Buena Park, CA (US)

(72) Inventor: Phil Rodriguez, Buena Park, CA (US)

(*) Notice: Subject to any disclaimer, the term of this patent is extended or adjusted under 35 U.S.C. 154(b) by 252 days.

(21) Appl. No.: 16/421,749

(22) Filed: May 24, 2019

(51) Int. Cl.
| G09B 5/06 | (2006.01) |
| H04R 1/02 | (2006.01) |
| G09B 19/00 | (2006.01) |
| G06F 3/16 | (2006.01) |
| H04R 3/12 | (2006.01) |
| H04R 1/40 | (2006.01) |

(52) U.S. Cl.
CPC .............. *G09B 5/06* (2013.01); *G06F 3/165* (2013.01); *G09B 19/00* (2013.01); *H04R 1/025* (2013.01); *H04R 1/403* (2013.01); *H04R 3/12* (2013.01)

(58) Field of Classification Search
CPC ........... G09B 5/06; G09B 19/00; G06F 3/165; H04R 1/025; H04R 1/403; H04R 3/12
See application file for complete search history.

(56) References Cited

U.S. PATENT DOCUMENTS

| 3,146,534 A | 9/1964 | Brown et al. |
| 5,346,399 A | 9/1994 | Sakow |
| 5,813,861 A | 9/1998 | Wood |
| 5,997,304 A | 12/1999 | Wood |
| 7,217,135 B2* | 5/2007 | Marcus .................... G09B 3/02 434/323 |
| 2003/0153413 A1 | 8/2003 | Wood et al. |
| 2016/0180734 A1* | 6/2016 | Shi .......................... A63F 13/77 434/169 |
| 2020/0027368 A1* | 1/2020 | Butler ...................... G09B 5/06 |

FOREIGN PATENT DOCUMENTS

WO  WO03058582 A1  7/2003

* cited by examiner

*Primary Examiner* — Fan S Tsang
*Assistant Examiner* — David Siegel
(74) *Attorney, Agent, or Firm* — Sanchelima & Associates PA; Christian Sanchelima; Jesus Sanchelima

(57) ABSTRACT

An electronic educational device comprising a plurality of character members and a base unit is disclosed herein. Each character member comprises an internal circuitry. The internal circuitry is configured to activate a speaker and illumination light upon activation of a sensory button found on each character member. The base unit comprises a longitudinal track member comprising a series of ports configured to receive connectors from the plurality of character members and a microcomputer. The microcomputer is configured to activate the speakers and illumination lights upon receipt of each character member in the base unit. The microcomputer is further configured to activate a main speaker and a plurality of lights of the base unit when the plurality of character members received in base unit are in a correct sequence thereby forming a word.

7 Claims, 2 Drawing Sheets

ELECTRONIC EDUCATIONAL DEVICE

BACKGROUND OF THE INVENTION

1. Field of the Invention

The present disclosure relates to an electronic educational device. More particularly, the present disclosure relates to an electronic play base educational toy.

2. Description of the Related Art

Recently, a variety of educational devices are catching the attention of toddlers and kids, as such devices provide audio and visual means of communication and interactivity. However, such devices mainly comprise a display screen for video rendering which is not encouraged by educators nor parents, as extended screen time hampers various cognitive skills of the growing toddlers and kids.

Applicant believes that a related reference corresponds to U.S. Pat. No. 5,813,861 that discloses an interactive learning device wherein the device has keys in the form of raised letters of the alphabet that are depressed to make a voice processor circuit recite the letters. Applicant also believes that a related reference corresponds to U.S. Pat. No. 7,217,135 that discloses an electronic educational toy designed to teach letters, words and numbers and stimulate the development of a child's mind using audio feedback. Applicant also believes that a related reference corresponds to U.S. Pat. No. 5,346,399 that discloses an interactive education apparatus comprising for the teaching of spelling and simple arithmetic to preschool children. Applicant also believes that a related reference corresponds to U.S. Pat. No. 3,146,534 that discloses a spelling device which provides for the matching of a picture with a word to be spelled out on a letter by letter basis. Applicant also believes that a related reference corresponds to U.S. Pat. No. 5,997,304 that discloses a phonics and reading teaching device which depicts an arrangement of indicia representing letters of the alphabet and their associated phonemes. Applicant also believes that a related reference corresponds to United States Patent Application 2003/0153413 that discloses a sports toy with multiple instructional modalities which combine auditory, visual, and kinesthetic stimulation to teach and reinforce language skills. Applicant believes that a related reference corresponds to Foreign Patent Document WO03058582A1 that discloses a sports toy with multiple instructional modalities which combine auditory, visual, and kinesthetic stimulation to teach and reinforce language skills.

However, none of the above references disclose an electronic educational spelling toy comprising a base slot, multiple letters and numbers having speakers, an activation button, a power supply, LED lights, and a processor.

Other documents describing the closest subject matter provide for a number of more or less complicated features that fail to solve the problem in an efficient and economical way. None of these patents suggest the novel features of the present invention.

SUMMARY OF THE INVENTION

It is an object of present invention to provide an electronic educational device comprising a plurality of character members and a base unit. Each character member comprises an internal circuitry. The internal circuitry is configured to activate a speaker and illumination light upon the activation of a sensory button of each character member. The base unit comprises a longitudinal track member comprising a series of ports configured to receive connectors of the plurality of character members and a microcomputer. The microcomputer is configured to activate the speaker and illumination light upon receipt of each character member in the base unit. The microcomputer is further configured to activate a main speaker and a plurality of lights of the base unit when the plurality of character members received in the base unit is in a correct sequence forming a word.

In accordance with an embodiment, the plurality of character members comprise one or both of: one or more letters and one or more numerals.

In accordance with an embodiment, the base unit further comprise an activate button configured to receive a long press gesture to locate one or more of a plurality of character members.

In accordance with an embodiment, the base unit is communicatively coupled with an electronic device via a communication network. The communication network is one of a long-distance network or a short-distance network.

In accordance with an embodiment, the electronic device displays multimedia content that corresponds to the plurality of character members received in the base unit in the correct sequence.

In accordance with an embodiment, the activated main speaker reproduces the pronunciation of formed word.

In accordance with an embodiment, the microcomputer is further configured to activate the main speaker when the plurality of character members received in the base unit is in an incorrect sequence not forming a word. The activated main speaker reproduces a pronunciation of each character member of the plurality of character members.

Further objects of invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
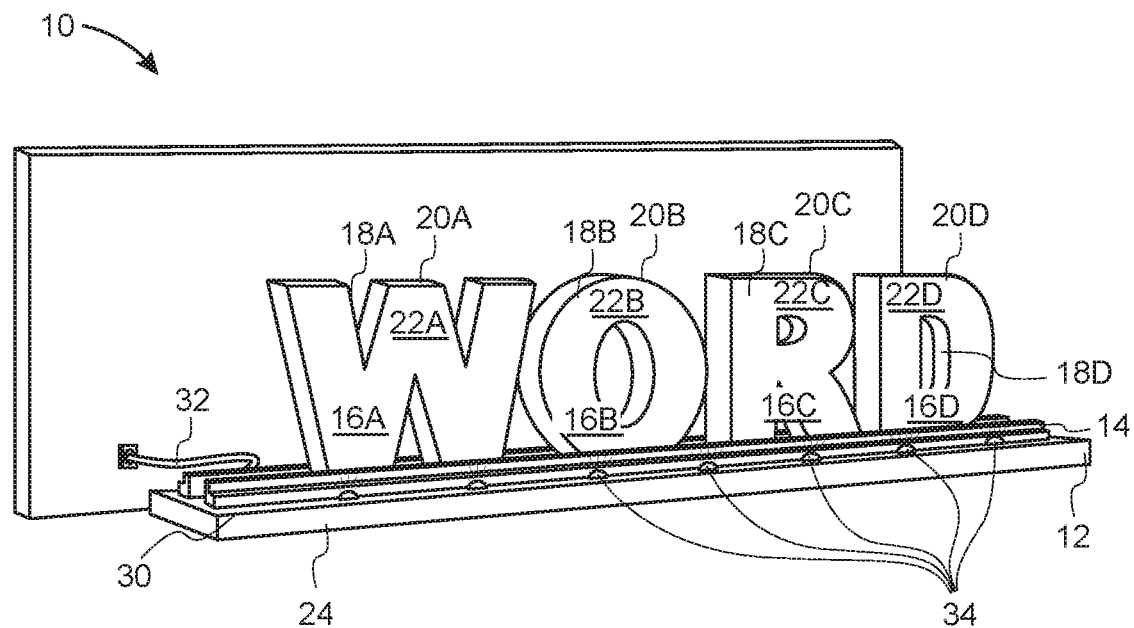
FIG. 1 represents the electronic educational device 10 of the present invention, according to an embodiment described herein.

Referring now to the drawings, FIGS. 1 to 3, where the present invention is generally referred to with numeral 10, it can be observed that an electronic educational device, in accordance with one embodiment, is provided that includes various components, a described hereinafter.

FIG. 1 represents an electronic educational device 10 of the present invention, according to an embodiment described herein. FIG. 1 illustrates various components of electronic educational device 10. Such components may include a base unit 12. The base unit 12 may comprise a longitudinal track member 14 comprising a series of ports.

Such components may further include a plurality of character members 16A to 16D, each character member of the plurality of character members 16A to 16D comprising an internal circuitry. The plurality of character members 16A to 16D may comprise one or both of: one or more letters and one or more numerals. Such components may further include a plurality of speakers 18A to 18D, a plurality of illumination lights 20A to 20D, and a plurality of sensory buttons 22A to 22D. For example, a character member "W" may have first speaker 18A, first illumination light 20A, and first sensory button 22A. Similarly, character member "O" may have second speaker 18B, second illumination light 20B, and second sensory button 22B, character member "R" may have third speaker 18C, third illumination light 20C, and third sensory button 22C, and character member "D" may have fourth speaker 18D, fourth illumination light 20D, and fourth sensory button 22D.

Base unit 12 may further include a microcomputer 24 for performing various basic functionalities, a main Universal Serial Bus (USB) port as a standard connection interface, an auxiliary port for audio equipment, such as headphones, that receives peripheral sound sources, a main speaker 30 for producing audio output, power supply 32 for providing electric power supply, and a plurality of lights 34, such as LED lights. The USB port may be used for a USB cable, and auxiliary port may be used for an auxiliary cable. It may be noted that both base unit 12 and plurality of character members 16A to 16D may comprise separate batteries (not shown), for example battery packs for facilitating portability. It may be further noted that electronic educational device 10 may be a Bluetooth-enabled device and base unit 12 may further include a hard drive that may provide additional storage for storing a higher range of words.

In operation, the internal circuitry of plurality of character members 16A to 16D may be configured to activate corresponding speakers of plurality of speakers 18A to 18D and illumination lights of plurality of illumination lights 20A to 20D upon activation of corresponding sensory buttons of plurality of sensory buttons 22A to 22D. In an embodiment, when a user presses a sensory button, for example first sensory button 22A, of a character member, for example first character member 16A, corresponding speaker, for example first speaker 18A, and illumination light, for example first illumination light 20A, are activated. In such way, the user may learn about sound and pronunciation of the corresponding character member.

In another embodiment, longitudinal track member 14 may comprise a series of ports configured to receive connectors of plurality of character members 16A to 16D. Accordingly, microcomputer 24 may be configured to activate plurality of speakers 18A to 18D and plurality of illumination lights 20A to 20D upon receipt of each character member in base unit 12.

In an embodiment, microcomputer 24 may be configured to activate main speaker 30 and the plurality of lights 34 of base unit 12 when the plurality of character members 16A to 16D are received in base unit 12 is in a correct sequence forming a word, such as "WORD". In such case, activated main speaker 30 may reproduce the pronunciation of the formed word "WORD".

In another embodiment, microcomputer 24 may be further configured to activate main speaker 30 when the plurality of character members 16A to 16D received in base unit 12 are in an incorrect sequence not forming a word. In such case, activated main speaker 30 reproduces a separate pronunciation of each character member of plurality of character members 16A to 16D.

In an embodiment, base unit 12 may comprise an activate button configured to receive a long press gesture from user to locate one or more of the plurality of character members 16A to 16D when the user is not able to find one or more plurality of character members 16A to 16D.

Figure 2:
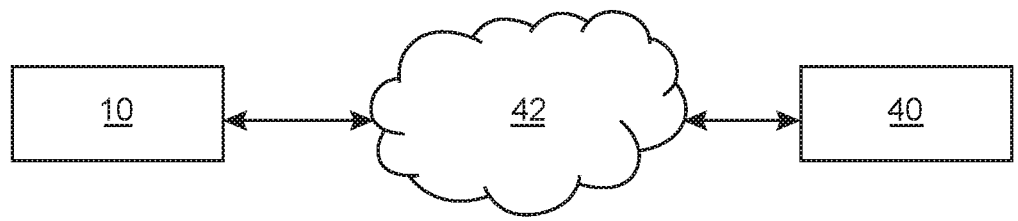
FIG. 2 represents a network environment of the electronic educational device 10 of the present invention, according to an embodiment described herein.

FIG. 2 represents a network environment of electronic educational device 10 of the present invention, according to an embodiment described herein. FIG. 2 illustrates electronic educational device 10 communicatively coupled with an electronic device 40 via a communication network 42. In an embodiment, communication network 42 may be a long-distance communication network. In another embodiment, communication network 42 may be a short-distance communication network. Electronic device 40 may be configured to display a multimedia content that corresponds to plurality of character members 16A to 16D received in base unit 12 in a correct sequence. For example, for a collection of words "The dog barks", the user may view a barking dog on electronic device 40. In another embodiment, electronic device 40 may be another base unit. In such case, the user may be able to create long sentences.

In an example embodiment, electronic educational device 10 may be made up of different material, such as metal plastic and various electronic components. In a use case, not limiting the scope of the disclosure, the height, width and depth of a character letter may be 3", 2.5" and 0.5", respectively. Further, not limiting the scope of the disclosure, the height, width and depth of base unit 12 may be 1.5", 13" and 2".

Figure 3:
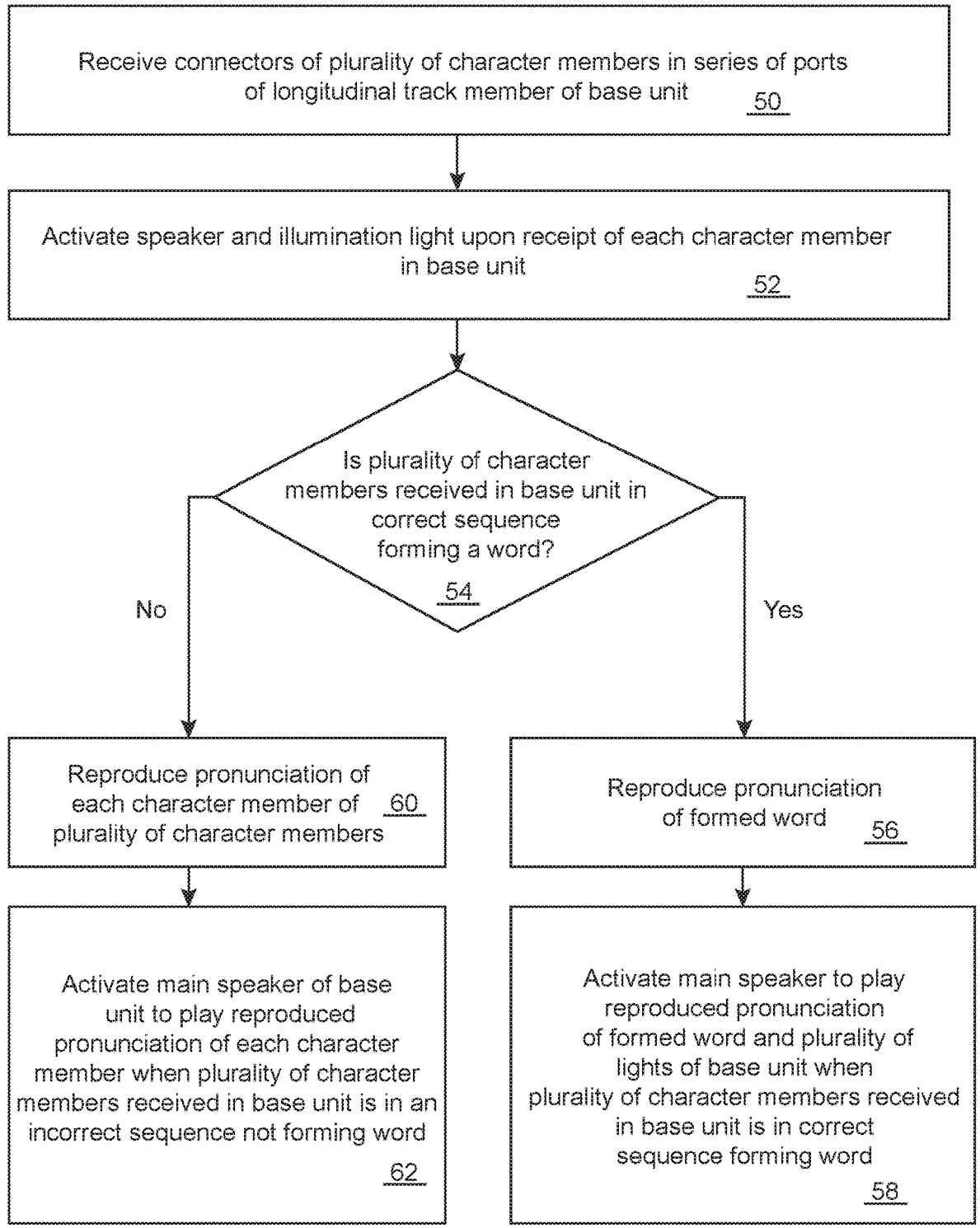
FIG. 3 represents a flowchart depicting various operations associated with the electronic educational device 10 of the present invention, according to an embodiment described herein.

FIG. 3 represents a flowchart depicting various operations associated with electronic educational device 10 of the present invention, according to an embodiment described herein.

At step 50, a series of ports of longitudinal track member 14 in base unit 12 may be configured to receive connectors of plurality of character members 16A to 16D.

At step 52, main speaker 30 and plurality of lights 34 of base unit 12 may be activated by microcomputer 24 in base unit 12 upon receipt of each character member of plurality of character members 16A to 16D in base unit 12.

At step 52, microcomputer 24 in base unit 12 may check whether plurality of character members 16A to 16D received in base unit 12 is in correct sequence forming a word. In an embodiment, when microcomputer 24 in base unit 12 determines that plurality of character members 16A to 16D received in base unit 12 are in correct sequence forming a word, control passes to step 56. In another embodiment, when microcomputer 24 in base unit 12 determines that plurality of character members 16A to 16D received in base unit 12 are in an incorrect sequence not forming a word, control passes to step 60.

At step 56, microcomputer 24 in base unit 12 may be configured to reproduce pronunciation of the formed word or words.

At step 58, microcomputer 24 in base unit 12 may be configured to activate main speaker 30 to play reproduced pronunciations of formed word or words and plurality of lights 34 of base unit 12 when the plurality of character members 16A to 16D received in base unit 12 are in a correct sequence forming a word or words.

At step 60, microcomputer 24 in base unit 12 may be configured to reproduce separate pronunciation of each character member of plurality of character members 16A to 16D.

At step 62, microcomputer 24 in base unit 12 may be configured to activate main speaker 30 of base unit 12 to play reproduced pronunciation of each character member when plurality of character members 16A to 16D received in base unit 12 are in an incorrect sequence not forming a word.

The proposed invention offers various advantages. The proposed invention helps a user, for example, a child, to enhance his gross motor and fine motor skills. The child would have to pick up the letters that would be enhancing his gross motor skills. The child would have to place the letter in the base unit that would be enhancing his fine motor skills. Pushing the activate button, may also enhance his fine motor skills.

Whatever letter the child places, the base unit lights up and says it. Therefore, the cognitive skills of the child will be enhanced. By spelling the words correctly, the base unit positively responds to the child. As a result, the language skills of the child will be enhanced. This also incorporates the cause and side effect, i.e. if the child spells the word correctly, the base unit will provide a positive response. If the child spells the word incorrectly, the base unit will just say the letter in the order that child had placed the letters in the base unit.

When the child spells the word correctly, then the base unit provides a positive response by lighting the word, saying the word, and then using the word in the correct content. For toddlers, the letter will have a speaker, action button, and a battery. When the toddler presses the letter, the base unit says the name of the letter. As a result, the toddler gets familiar with the letters and how they are pronounced. Thus, the unit allows the child to interact on his different skill level, thereby providing the child to have fun in the learning process. This helps the child to learn better and faster. Further, the proposed electronic educational toy 10 can be used for learning various languages.

The proposed invention thus provides an effective way to learn the alphabets, words, and numbers. It offers an alternative to traditional educational toys and games. It is quite convenient, easy to use with a unique design. It is ideal for toddlers and young children.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic educational device comprising:
a plurality of character members;
a plurality of speakers;
a plurality of illumination lights;
a plurality of sensory buttons;
a base unit comprising:
a longitudinal track member;
a power supply;
a microcomputer configured to activate said plurality of speakers and said plurality of illumination lights upon receipt of each character member in said base unit; and
a main speaker and a plurality of lights activated by said microcomputer when said plurality of character members received in said base unit are in a correct sequence forming a word, wherein said microcomputer is further configured to activate said main speaker when said plurality of character members received in said base unit is in an incorrect sequence not forming a word, wherein said activated main speaker reproduces a pronunciation of each character member of said plurality of character members.

2. The electronic educational device of claim 1, wherein said plurality of character members comprises one or both of: one or more letters and one or more numerals.

3. The electronic educational device of claim 1, wherein said base unit further comprises an activate button configured to receive a press gesture to locate one or more of said plurality of character members.

4. The electronic educational device of claim 1, wherein said base unit is communicatively coupled with an electronic device via a communication network.

5. The electronic educational device of claim 4, wherein said communication network is one of a long-distance network or a short-distance network.

6. The electronic educational device of claim 4, wherein said electronic device displays multimedia content that corresponds to said plurality of character members received in said base unit in said correct sequence.

7. The electronic educational device of claim 1, wherein said activated main speaker reproduces the pronunciation of a formed word.

* * * * *